United States Patent [19]

Gatley et al.

[11] Patent Number: 4,976,910
[45] Date of Patent: Dec. 11, 1990

[54] METHOD OF MAKING A COOLING DEVICE

[76] Inventors: Richard Gatley, Ayngstree Cottage, Clifton-on-Teme, Worcester; Ian F. Fox, Sinton Meadows, Stocks Lane, Leigh Sinton, Worcestershire, both of United Kingdom; Greville T. Neale, Worcestershire, all of United Kingdom

[21] Appl. No.: 279,542

[22] Filed: Dec. 5, 1988

Related U.S. Application Data

[63] Continuation-in-part of Ser. No. 126,574, Nov. 30, 1987, abandoned.

[51] Int. Cl.$^5$ .................... B29C 39/10; B29L 31/18
[52] U.S. Cl. ................................ 264/278; 249/91; 249/97; 264/310; 425/116; 425/435; 29/726; 29/DIG. 6
[58] Field of Search .............. 264/248, 261, 263, 275, 264/310, 311, 255, 278, 267; 425/425, 435, 110, 116; 164/10, 11, 19, 23; 29/DIG. 6, 726; 249/91, 96, 97, 145

[56] References Cited

U.S. PATENT DOCUMENTS

| | | | |
|---|---|---|---|
| 2,433,546 | 12/1947 | Cornelius | 264/248 |
| 3,435,893 | 4/1969 | Withers | 264/248 |
| 3,610,457 | 10/1971 | Opalewski | 220/22 |
| 3,799,831 | 3/1974 | Griffiths | 264/275 |
| 4,001,110 | 1/1977 | Geen et al. | 264/248 |
| 4,023,257 | 5/1977 | Wright et al. | 264/275 |
| 4,143,193 | 3/1979 | Rees | 220/454 |
| 4,167,382 | 9/1979 | Freedman et al. | 425/435 |
| 4,422,305 | 12/1983 | Grosskopf | 62/430 |
| 4,459,812 | 7/1984 | Norton | 62/75 |

FOREIGN PATENT DOCUMENTS

| | | |
|---|---|---|
| 3796694 | of 1931 | Belgium . |
| 0061697 | 10/1982 | European Pat. Off. . |
| 0104699 | 4/1984 | European Pat. Off. . |
| 1451232 | 1/1969 | Fed. Rep. of Germany . |
| 2303460 | 8/1973 | Fed. Rep. of Germany ...... 264/310 |
| 1576425 | 8/1969 | France . |
| 8102994 | 10/1981 | PCT Int'l Appl. . |
| 742413 | 12/1955 | United Kingdom . |
| 878971 | 10/1961 | United Kingdom . |
| 1160961 | 8/1969 | United Kingdom . |
| 1186463 | 2/1970 | United Kingdom ................ 264/275 |
| 1384468 | 2/1975 | United Kingdom . |
| 1469958 | 4/1977 | United Kingdom . |
| 2179290 | 3/1987 | United Kingdom ................ 264/275 |

Primary Examiner—James Lowe
Assistant Examiner—Mathieu Vargot
Attorney, Agent, or Firm—Varnum, Riddering, Schmidt & Howlett

[57] ABSTRACT

A cooling device of the kind used in transportation vehicles, designed to maintain the transportation space of such vehicles cool over prolonged periods, includes an elongate housing of generally rectangular cross-section, having side walls and first and second end walls. The cooling device further includes a cooling pipe of elongate "U"-shape, having a curved portion and parallel arms. The ends of the cooling pipe are secured within one end wall, and the central portion of the pipe is supported in relation to the opposed wall by a supporting means. The cooling device is produced by locating the cooling pipe in a rotational moulding mould, whereby the various unions attached to the pipe are secured integrally with the end wall of the housing, while, in one embodiment, the mounting device is moulded into the opposed wall, in a second embodiment a threaded aperture is provided enabling the mounting device to be screwed into the opposed wall, and in a third embodiment integral pillars are provided to support the cooling pipe.

11 Claims, 6 Drawing Sheets

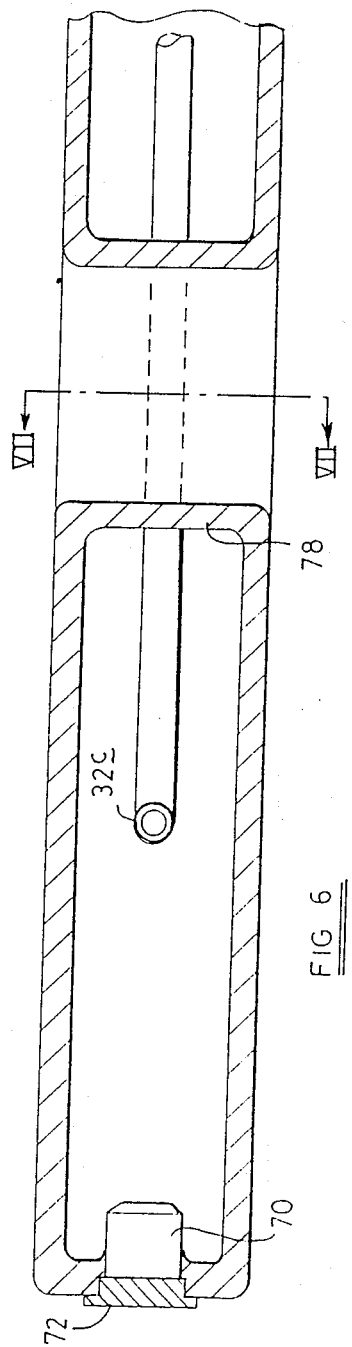
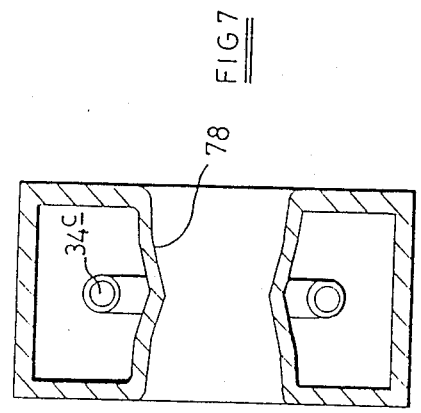
FIG 6
FIG 7

METHOD OF MAKING A COOLING DEVICE

CROSS-REFERENCES TO RELATED APPLICATIONS

This application is a continuation-in-part of U.S. application Ser. No. 126,574, filed Nov. 30, 1987, now abandoned.

FIELD OF THE INVENTION

This invention is concerned with improvements relating to cooling devices, particularly of the kind (hereinafter referred to as being "of the kind specified") having a relatively high specific/latent heat, and which may be used to retain a space in which it is located cool for a relatively long period of time.

BACKGROUND OF THE INVENTION

For example, cooling devices of the kind specified are used in vehicles to retain the transportation compartment of the vehicle, and the goods transported, at low temperature. Conventionally a cooling device comprising an elongate housing is utilised, which may be mounted in the roof of the transporation compartment and which is filled with a eutectic liquid (conventionally comprising brine) and through which a cooling pipe extends. During charging of the cooling device a cooling liquid is fed through the cooling pipe from a refrigeration device to freeze the eutectic liquid, which then absorbs heat from the transporation compartment over a period of time to retain the transportation compartment at a desired temperature.

It will of course be appreciated that the nature of the eutectic liquid is selected so as to retain the transportation compartment at a desired temperature determined by the freezing/melting point of the eutectic liquid.

Whilst conventionally such cooling devices have been of metal, it has more recently been appreciated that plastics provides a highly desirable material for the elongate housing. A known method of manufacturing such cooling devices involves the use of a housing in the form of an extrusion of generally rectangular cross-section, into which a cooling pipe is located and on to which end caps are secured. Desirably, however, the cooling pipe enters and exits the housing at the same end, with the pipe extending as an elongate "U" within the housing. Thus the extrusion is of non-square rectangular cross-section. During the extrusion of such a housing there is a tendency for the side walls of larger width to collapse inwardly. Consequently it has become conventional practice to utilise as a housing for a cooling device of the kind specified an extrusion having a web interconnecting the opposite side walls approximately centrally thereof. However, the utilisation of such a web has the disadvantage, that it does not permit any significant increase in the volume confined by the housing under differential expansion, and it may be necessary to fill the housing with eutectic liquid to an extent less than 100%, to provide space for such differential expansion.

Difficulty is also encountered in cooling devices using extruded housings in the supporting of the cooling pipes, particularly during differential thermal expansion, and in practice it has been found necessary to utilise spacer elements on the pipe which engage with the walls on the housing compartments. This however restricts free-flow of the eutectic liquid within the housing, and localised areas of eutectic liquid may result which are surrounded by plugs of frozen material. This under certain circumstances can cause damage to the housing.

Another difficulty which has been encountered is that, in cooling devices of the kind specified, it is on the one hand desirable to utilise steel as cooling pipework, but to utilise brass connections on the housing by which the device may be connected to a refrigeration unit. However, in use, electrolytic action of the brine causes damages at the junction between the steel and brass. For this reason it is in general necessary to utilise copper for the cooling pipes.

SUMMARY OF THE INVENTION

According to this invention there is provided a method of manufacturing a cooling device comprising a housing containing a eutectic liquid, an elongate cooling pipe in the housing through which cooling fluid is fed to cool the eutectic liquid, the elongate pipe comprising end portions and an intermediate portion between said end portions, said method involving the steps:

(a) locating the end portions of the pipe in a rotational mould;

(b) supporting the cooling pipe within the mould by the use of supporting means extending through a wall of the mould to said intermediate portion; and (c) rotationally-moulding the housing of the cooling device around the cooling pipe and around the supporting means.

The supporting means may comprise a support member which engages said intermediate portion to provide support for the cooling pipe, for example comprising a mounting device which is supported in an aperture in a wall of the mould, and which on completion of the moulding operation, is removed to provide an aperture in the housing. Conveniently under such circumstances the aperture provides a means for the introduction of a eutectic liquid into the cooling device on completion of moulding, said aperture being closed subsequent to filling.

Preferably the method also involves the steps of moulding across the housing at least one hollow pillar, moulded at a location such as to extend between spaced parallel portions of the cooling pipe, conveniently being moulded at a location such as to provide a means for support of the cooling pipe in relation to the side walls of the housing.

In such a method, preferably the supporting means comprises a support member which is urged against the cooling pipe during rotationally-moulding of the housing and said hollow pillar, to support the pipe during moulding, said support member being removed from engagement with the cooling pipe on completion of moulding of the housing.

Advantageously during carrying out said method the end portions of the cooling pipe are located in one end wall of the rotational mould, the intermediate portion of the cooling pipe being supported by the supporting means in relation to the opposite end wall of the mould.

According to this invention there is also provided a cooling device manufactured by the method set out in the last preceding paragraphs.

Preferably the cooling device comprises a rotationally-moulded housing containing a eutectic liquid, an elongate cooling pipe in the housing through cooling fluid may be fed to cool the eutectic liquid, the elongate pipe comprising end portions and an intermediate portion between said end portions, an aperture in one end wall of the housing for the introduction of eutectic liquid in the housing, and means to close said aperture.

Preferably the device comprises a supporting means for the cooling pipe which is slidably mounted in relation to a mounting device which extends through an aperture provided in one end wall of the housing.

Alternatively or in addition the supporting means for the cooling pipe may be afforded by at least one hollow pillar extending between side walls of the housing, so arranged as to provide support for the cooling pipe in use of the cooling device.

According to this invention there is also provided a cooling device comprising a rotationally-moulded housing comprising side walls and opposite end walls; a cooling pipe in the housing, said cooling pipe having opposite end portions extending through one end wall of the housing; at least one hollow pillar extending between the side walls of the housing integrally therewith and passing between generally parallel portions of the cooling pipe; and an aperture in the housing for the introduction of liquid into the housing.

BRIEF DESCRIPTION OF THE DRAWINGS

There will now be given a detailed description, to be read with reference to the accompanying drawings, of three cooling devices, and methods of production thereof which are preferred embodiments of this invention, and which have been selected for the purposes of illustrating the invention by way of example.

In the accompanying drawings:

FIG. 6 is a schematic sectional view, taken on the lines VI—VI of FIG. 5, of said second embodiment, subsequent to completion of the moulding process;

FIG. 7 is a sectional view taken on the lines VII—VII of FIG. 6; and

DESCRIPTION OF THE PREFERRED EMBODIMENTS

The cooling devices which are the preferred embodiments of this invention are generally for use in transportation vehicles, and are designed to maintain the transportation space of such vehicles cool over prolonged periods. It will be appreciated however that the cooling device may also be used in relation to the maintenance of static places at a low temperature.

Figure 1:
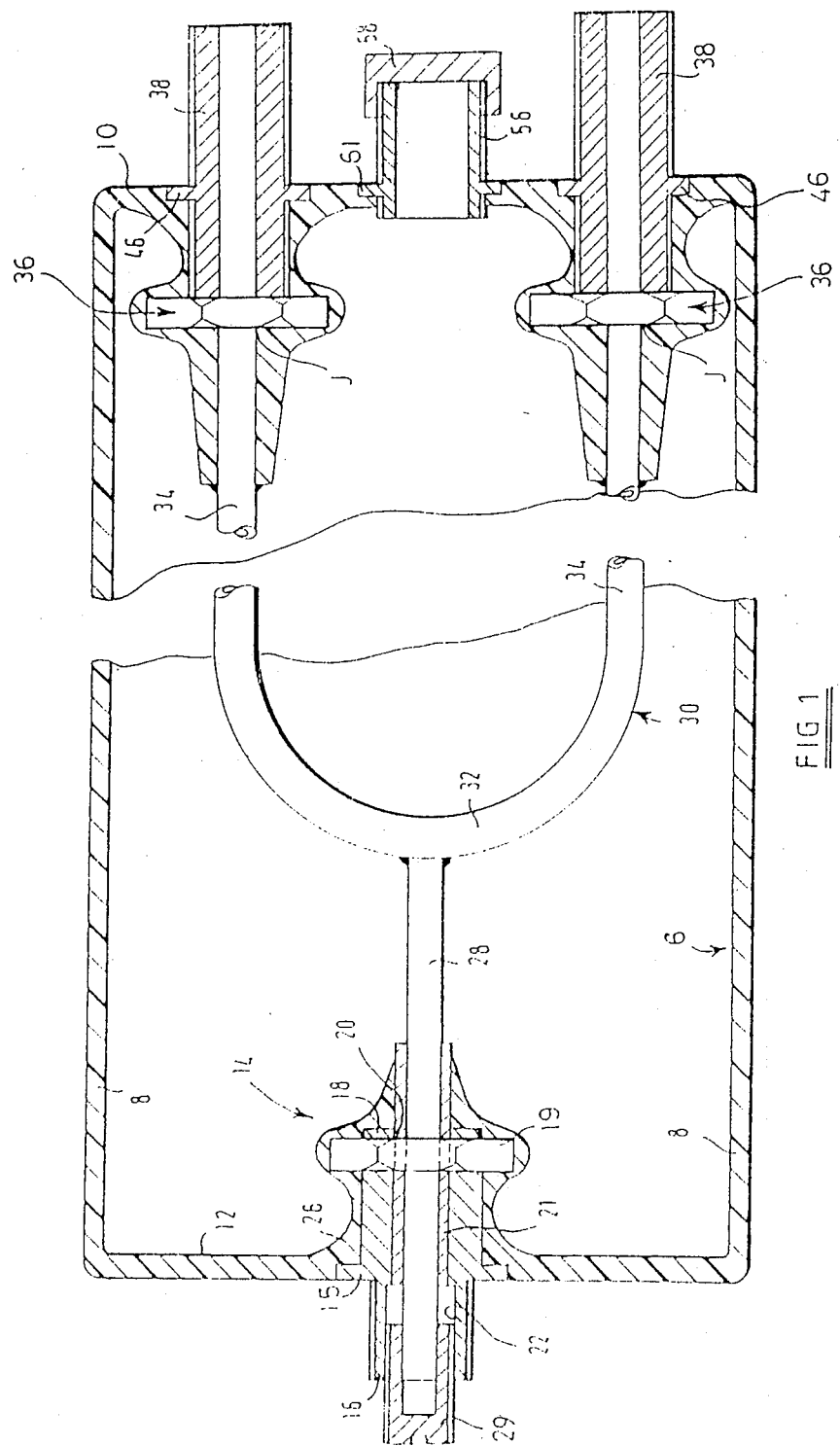
FIG. 1 is a schematic sectional view of the cooling device which is the first embodiment of this invention.

The device which is the first embodiment of this invention (FIG. 1) comprises an elongate housing 6 of generally rectangular cross-section, comprising side walls 8 and first and second end walls 10, 12. Mounted generally centrally within the end wall 12 is a mounting device 14 comprising a central flange 15, from one side of which extends a boss 16, which is threaded both interiorly and exteriorly. From the other side of the flange 15 a boss 18 extends on the exterior of which a nut 19 is provided and which is provided with a through-bore 20. Located in the bore 20 is a sleeve 21 of PTFE The cooling device also comprises a cooling pipe 30 of elongate "U"-shape, comprising a curved portion 32 and parallel arms 34. The cooling pipe is of steel, and comprises an elongate support member 28 brazed to the centre of the curved portion 32, so as to extend generally parallel to, but in opposite directions from, the parallel arms 34. The support member extends into the bore 20 of the boss 18, the sleeve 21 assisting relative sliding movement. At its left-hand end, the support member extends into an axial bore 22 in the boss 16, into which an end cap 29 is secured, the member 28 extending into a bore of the cap 29.

Each of the arms 34 is brazed to a brass union 36, each union 36 being somewhat similar to the mounting device 14, comprising a generally central flange 46 and an exteriorly threaded boss 38 extending through the end wall 10.

On the exterior of the housing, an exterior pipe may be connected to the boss 38 by a clamping nut (not shown).

Also provided in the end wall 10 is an inlet fitting 56, through which the housing 6 may be filled with a eutectic liquid, the fitting 56 subsequent to such filling being closed by a sealing cap 58.

Figure 2:
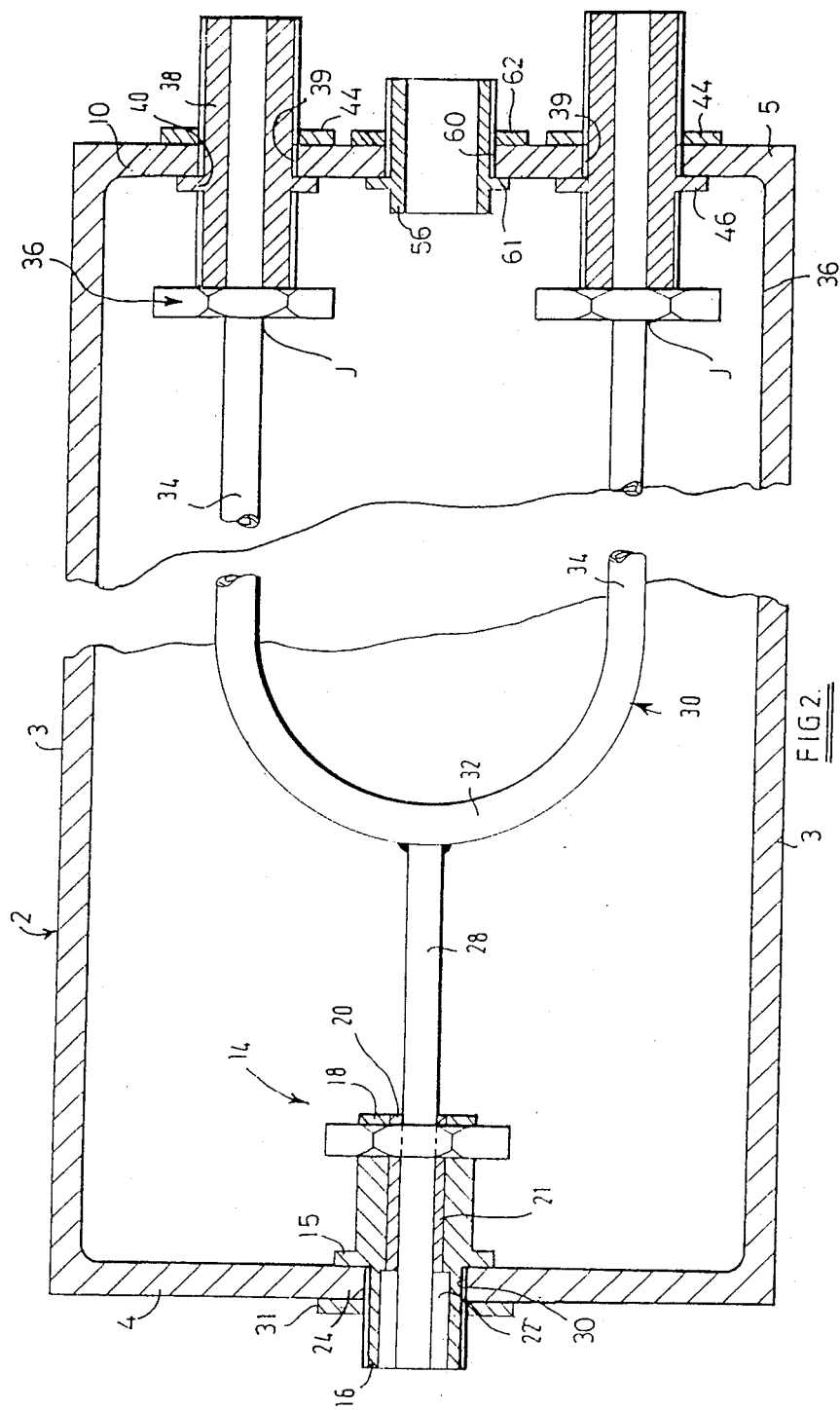
FIG. 2 is a schematic sectional view illustrating the method of manufacture of the first embodiment.

The method of manufacture of the first embodiment, which method is also illustrative of the invention, will now be described with reference to FIG. 2 of the drawings, showing a rotational-moulding mould 2 comprising side walls 3, and end walls 4 and 5.

The cooling pipe 30, together with the unions 36 secured to the arms 34 thereof, is located within the mould, and the threaded bosses 38 are inserted through non-threaded apertures 39 in the end wall 5 of the mould, until the flanges 46 thereof abut against the interior of the end wall. The bosses are secured in position by the use of lock nuts 44 threaded over the protruding ends of the bosses 38. An inlet fitting 56, without the cap 58, is inserted in a similar way through a bore 60 in the end wall, a flange 61 being pulled into enagagement with the interior face of the end wall by a lock nut 62.

At the other end the supporting device 14 is slid over the supporting member 28, and is then moved outwardly through an unthreaded bore 30 in the end wall 4, the flange 15 being pulled into engagement with the interior face of the wall 4 by a lock nut 31 screwed onto the boss 16.

Moulding powder is then introduced into the mould in a conventional manner, and the mould is rotated, conventionally about three axes of rotation, to cause moulding power to adhere to the heated surfaces of the mould.

Since the pipe 30 is not heated to any significant extent, plastics material will not be deposited thereon. However mounting device 14 and the unions 36, being supported in the walls of the mould, will be heated to some extent, causing plastics material to be deposited thereon. Thus a skin of plastics material extends from the wall over the mounting device 14 and over both unions 36. This skin of plastics material has two advantages: in relation to the mounting device 14 and unions 36, it may wholly prevent eutectic liquid leaking from the housing 6 during use of the cooling device, and in relation to the unions 36, covers the junction (indicated by the letter "J" in the drawings) between the steel pipe 30 and the brass unions 36, protecting such junction against damage to due to electrolytic action of the eutectic liquid.

On completion of moulding, as the mould cools, the lock nuts 31, 44 and 62 may be released, to allow subsequent opening of the mould, and removal of the cooling device therefrom. Subsequently, an end cap 29 may be mounted on the boss 16, and eutectic liquid (such as brine) may be introduced into the housing through the fitting 56, which is subsequently closed by the sealing cap 58.

Figure 8:
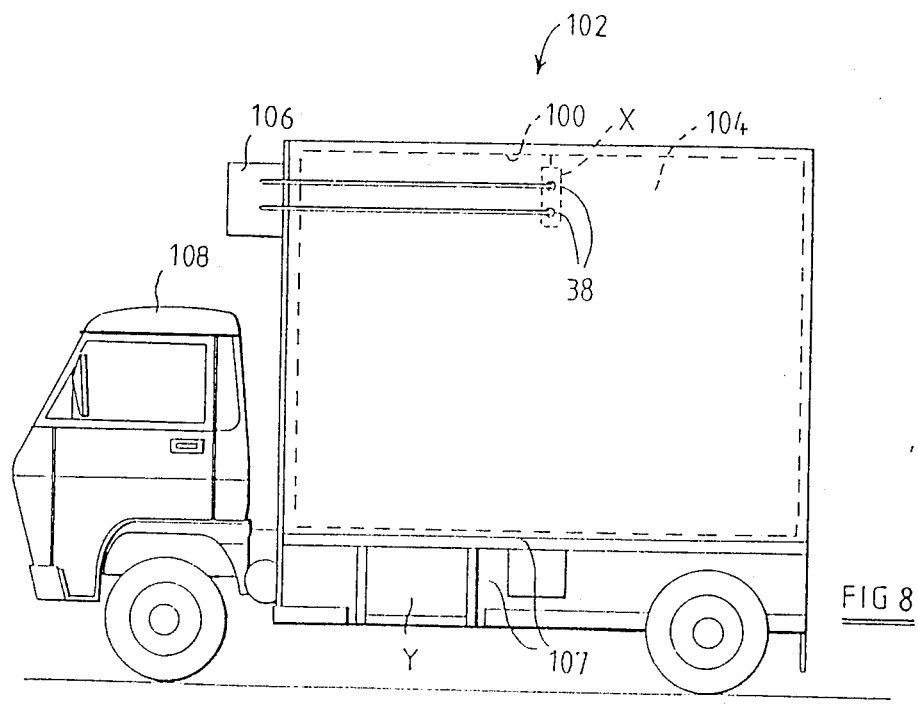
FIG. 8 is a schematic side elevational view of a transportation vehicle to which a cooling device in accordance with the invention is fitted.

In use the cooling device which is the first embodiment of this invention is mounted adjacent to the roof of a transportation vehicle, for example at a location X adjacent to the roof 100 of a wheeled road-going transportation vehicle 102 shown in FIG. 8, within a transportation compartment 104 of the vehicle, conveniently utilising as mounting means the boss 16, and if desired the bosses 38, and the exterior pipes are connected to a refrigeration unit 106, conventionally mounted above/behind the vehicle cab 108. At a convenient time (usually overnight, or when the vehicle is not otherwise being used) the refrigeration unit is powered, and cooling liquid flows into the cooling pipe 30 via the exterior pipes, reducing the temperature of the eutectic liquid within the housing 6 until such eutectic liquid freezes. During such reduction in temperature, differential thermal contraction, particularly of the pipe 30 relative to the housing 6, involves an extension of the support member 28 within the bore 20 (that is, movement to the left, as shown in the drawings).

In FIG. 8, the cooling device is suspended fractionally below the roof of a vehicle 100 by use of a bracket, and may be one of a succession of such devices disposed along the roof in this way. If desired, such a cooling device could alternatively be mounted within the compartment 104 on a side wall thereof or on a front wall thereof. The refrigeration unit 106 could alternatively be mounted below the compartment 104, such as at Y on a chassis 107 of the vehicle, or could be split between a plurality of locations on the vehicle e.g. partly in the cab and partly on the remainder of the vehicle.

The cooling device which is the second embodiment of this invention is similar to that which is the first embodiment, and will be described hereinafter only in as much as it differs from said first embodiment, similar numerals being utilised in FIG. 3 in relation to the second embodiment, with a suffix a where appropriate.

In the second embodiment, the end wall 12 is provided, during the moulding thereof, with a threaded aperture 27, within which a mounting device 70 is screwed, the mounting device comprising a plug 72, and a stem 74.

The support member secured to the cooling pipe portion 32 is in the form of a hollow sleeve 28a, in which the stem 74 extends, providing support for the cooling pipe 30 whilst allowing a small degree of relative movement to take place longitudinally of the stem 74, due to differential expansion and contraction between the cooling pipe and the housing.

Figure 4:
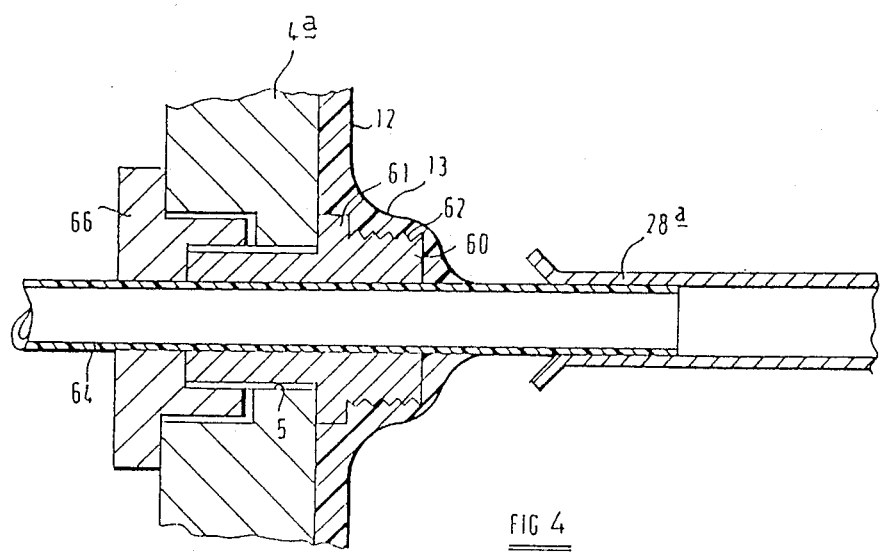
FIG. 4 is a partial sectional view showing a stage in the moulding of the second embodiment.

The aperture 27 is provided in the end wall 12 by the use of an insert member 60, located in an aperture in the end wall mould portion 4a prior to commencement of the rotational moulding operation (see FIG. 4). The insert member 60 is positioned within an aperture 5 of the mould portion, with a shoulder 61 engaging an inner wall of the mould. A hollow tube 64 of PTFE coated or sleeved material is inserted through a longitudinal bore of the insert member, the tube 64 entering the hollow sleeve 28a secured to the cooling pipe portion 32, to support the cooling pipe during moulding, as has previously been described. A nut 66 is then screwed onto the exterior of the insert member 60, to hold the resulting assembly in position during moulding.

During rotational moulding, the insert member 60 becomes hot and moulding material adheres to the exterior thereof, as is shown at 13 in FIG. 4.

As will be seen from FIG. 4, the part of the insert member 60 which projects interiorly of the mould cavity is threaded, as at 62. Thus on completion of moulding the nut 66 may be withdrawn, and on separation of the mould members, the insert member 60 may be screwed away from the thickened portion 13 leaving the threaded aperture 27 extending through the end wall 12.

It will be appreciated that whilst moulding material may temporarily adhere to the tube 64, particularly in the region thereof immediately adjacent to the insert member 60, it may nonetheless readily be withdrawn by virtue of its construction of PTFE.

The aperture 27 may be utilised for the introduction of eutectic liquid into the interior of the housing, and on completion of filling, the aperture 27 may be closed by the use of the mounting device 70, an "O" ring being utilised to prevent leakage of fluid between the aperture 27 and the mounting device.

During the insertion of the mounting device into the aperture 27, the stem 74 enters the hollow sleeve 28a, conveniently being guided therein by a flaring of the outer end of the sleeve 28a.

As will be appreciated, by virtue of the fact that eutectic liquid may be introduced into the housing through the aperture 27, the aperture and plug system 56/58 required in the first embodiment is no longer necessary.

Figure 3:
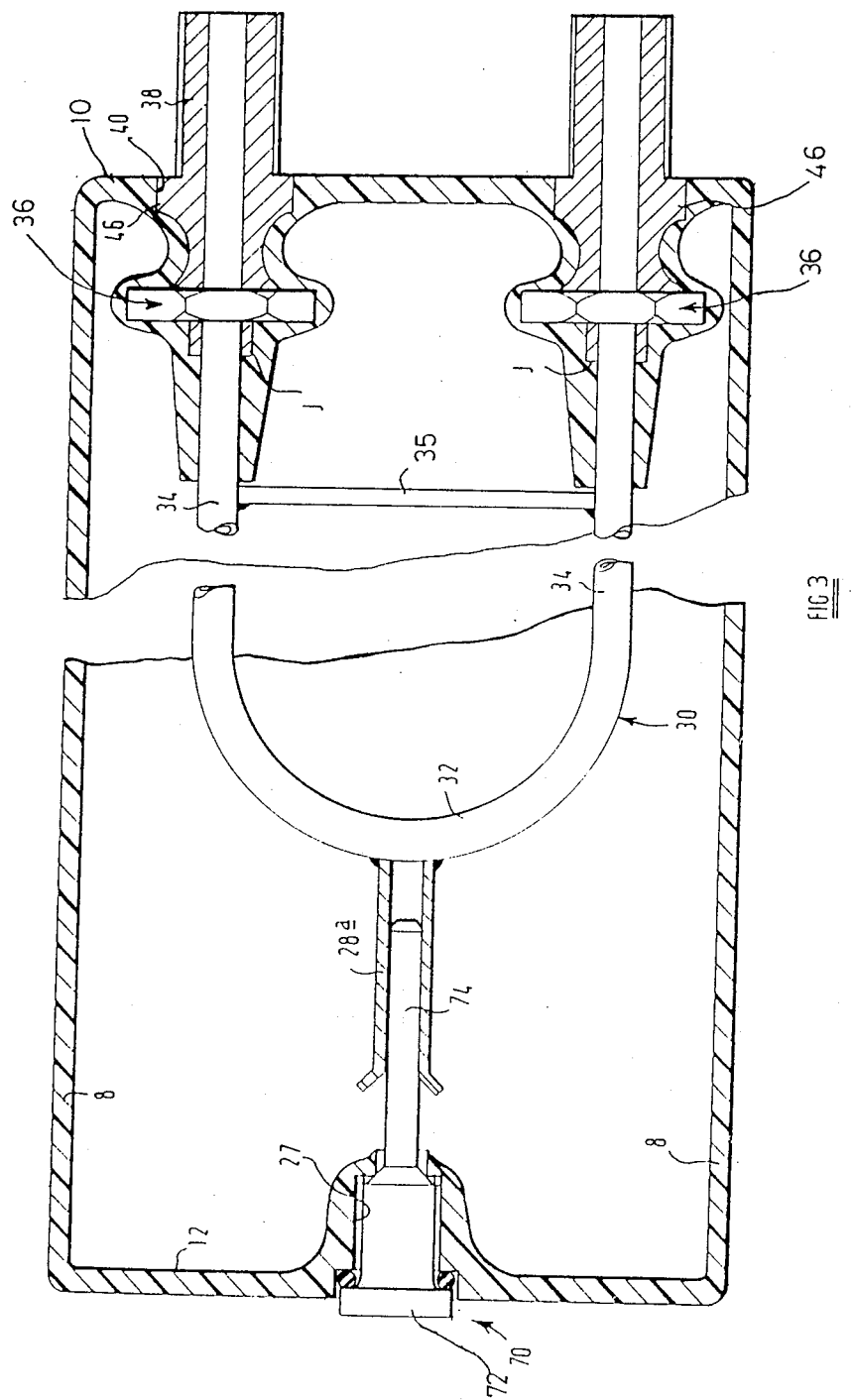
FIG. 3 is a schematic sectional view of the cooling device which is the second embodiment of this invention.

In the embodiment of FIG. 3, a plate element 35 welded between the arms 34 during manufature of the cooling pipe, and extending transversely between the arms 34, helps to prevent torsional twisting of the arms 34 during use due to tightening or untightening of such clamping nuts as may be utilised in the connection of exterior pipes to the bosses 38, so lessening risk of damage and/or leaks in the vicinity of the bosses 38.

Figure 5:
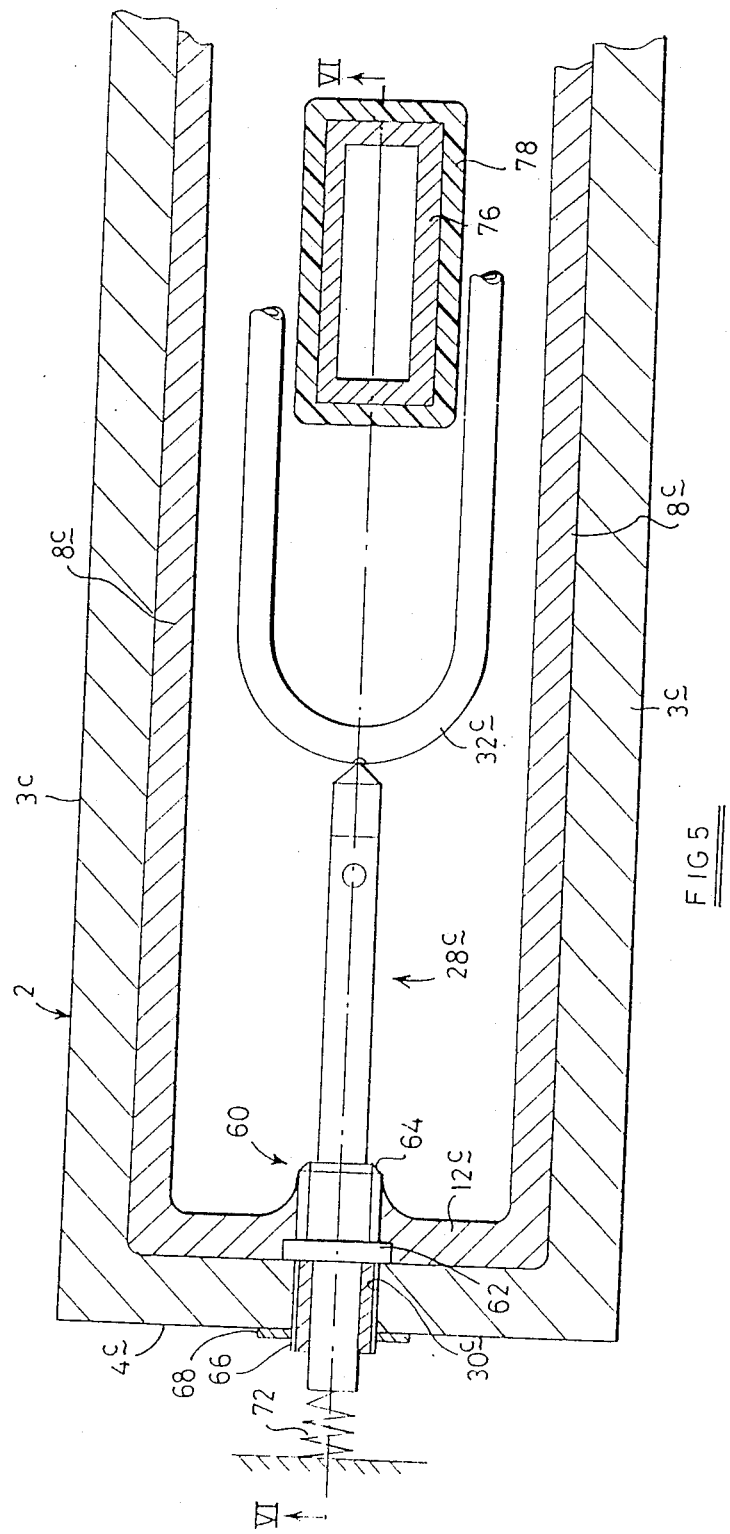
FIG. 5 is a schematic sectional view of a third embodiment of the invention.

The cooling device which is the third embodiment of this invention is similar to that which is the first embodiment, and will be described hereinafter only inasmuch as it differs from said first embodiment, similar numerals being utilised in FIG. 5 in relation to the third embodiment, with a suffix c where appropriate.

In the third embodiment, a mounting device 60 is utilised which comprises a generally central flange 62, a hollow boss 64 extending from one side of the flange 62, and an exteriorly threaded boss 66 extending from the opposite side. The boss 66 is inserted through an unthreaded bore 30c in the end wall 4c of the mould, and the flange 62 is pulled against the interior face of said end wall by a lock nut 68. A supporting member 28c is provided which is inserted through the central bore 28c of the boss 66, and through the hollow boss 64, and which is urged forwardly by a spring 72 into engagement with a small dimple provided in the intermediate portion 32c of the cooling pipe.

At the right hand side, the cooling pipe is secured to the mould as shown in FIG. 3.

Additionally extending between side walls of the mould are hollow pillars 76, heated in conventional manner with the remainder of the mould parts. The hollow pillars 76 are so arranged as to extend between the parallel arms of the generally U-shaped cooling pipe 34c, and are heated in conventional manner so as to cause plastics material to adhere thereto during the rotationally-moulding operation, to provide hollow pillars 78 integral with the side walls 8c of the housing 3c, which extend across the housing and between the parallel arms of the cooling pipe.

The supporting member 28c, being hollow, acts as a breather tube during the moulding process, being coated with PTFE to prevent the adherence of moulding material thereto. On completion of the moulding operation, the supporting member 28c is removed. Should the contact between the supporting member 28c and the cooling pipe 32c cause any damage to the surface coating of the cooling pipe, it may be desirable to repair such damage, such as by the use of localised heating of the pipe, to cause the coating thereof to partially melt and seal over the damaged area. Subsequently eutectic liquid (such as brine) may be introduced through the fitting 60, which is subsequently closed by an appropriate plug secured on to boss 66, or by a substituted collar 70 secured in the wall of the housing, and a plug 72 as shown in FIG. 6.

The pillars 78 provide not only a support for the housing in general, providing additional strength to the cooling device, but additionally, when the cooling device in arranged in the orientation shown in FIG. 7 for use, (i.e. with the U-shaped cooling pipe lying in a generally vertical plane) enables the cooling pipe to rest on the pillars without the need for a permanent fixed member between the portion 32c and the rear wall 4c of the mould.

What is claimed is:

1. A method of manufacturing a cooling device comprising a housing for containing a eutectic liquid, an elongate cooling pipe in the housing through which cooling fluid is fed to cool the eutectic liquid, the elongate pipe comprising end portions and an intermediate portion between said end portions, involving the steps:
   (a) locating the end portions of the pipe in a rotational mold;
   (b) supporting the cooling pipe within the mold by the use of a supporting means supported in an aperture in a wall of the mold and extending therethrough to said intermediate portion;
   (c) rotationally molding the housing of the cooling device around the cooling pipe and around the supporting means; and
   (d) removing the supporting means on completion of the molding operation to provide an aperture in the housing.

2. A method according to claim 1 wherein the supporting step is carried out by engaging a support member with said intermediate portion to provide support for the cooling pipe.

3. A method according to claim 1 wherein said aperture provides a means for the introduction of a eutectic liquid into the cooling device.

4. A method according to claim 3 wherein said aperture is closed by said mounting device.

5. A method according to claim 1 comprising the step of moulding across the housing at least one hollow pillar.

6. A method according to claim 5 wherein the hollow pillar is moulded at a location such as to extend between spaced parallel portions of the cooling pipe.

7. A method according to claim 5 wherein said hollow pillar is moulded at a location such as to provide a means to support the cooling pipe in relation to side walls of the housing.

8. A method according to claim 5 wherein the supporting step includes providing a support member which is spring urged against the cooling pipe during rotational molding of the housing and said hollow pillar, said support member being removed from engagement with the cooling pipe on completion of molding of the housing.

9. A method according to claim 1 wherein the end portions of the cooling pipe are located in one end wall of the rotational mould, and the intermediate portion of the cooling pipe is supported by the supporting means in relation to the opposite end wall of the mould.

10. A method of manufacturing a cooling device of the kind comprising a housing for containing a eutectic liquid, an elongate cooling pipe in the housing through which cooling fluid may be fed to cool the eutectic liquid, the elongate pipe comprising end portions extending through an end wall of the housing, and spaced intermediate portions extending in the housing from said end portions to a generally U-shaped portion, the method involving the steps:
   (a) procuring a rotational mold comprising support post molding means extending between opposite side walls of the mold;
   (b) procuring a pipe comprising end portions and spaced intermediate portions extending from said end portions to a generally U-shaped portion;
   (c) locating the end portions of the pipe in an end wall of the mold with the intermediate portions extending within the mold on opposite sides of the support post molding means;
   (d) supporting the cooling pipe in the mold by use of a retractable supporting means extending from the mold and engaging the cooling pipe;
   (e) rotationally molding the housing within the mold, the support post molding means producing a hollow support member extending through the interior of the housing from one side wall thereof to the other integral with said side walls, extending between the intermediate portions;
   (f) withdrawing the retractable supporting means.

11. A method according to claim 10 wherein an aperture in the housing provided when the retractable support means is removed is provided with a fitting to provide the housing with inlet means.

* * * * *